United States Patent Office 2,848,439
Patented Aug. 19, 1958

2,848,439

LINEAR POLYESTERS OF BIS(N-p-CARBOXY-PHENYL) ALKYLENE DIAMIDES AND MANUFACTURE THEREOF

Delbert D. Reynolds and Thomas M. Laakso, Rochester, N. Y., assignors to Eastman Kodak Company, Rochester, N. Y., a corporation of New Jersey No Drawing. Application April 26, 1955
Serial No. 504,101

12 Claims. (Cl. 260—75)

This invention relates to improved linear polyesters and to the manufacture thereof and shaped articles prepared therefrom. More particularly, the invention is concerned with highly polymeric linear polyesters characterized by a regular, rather than a random, structure and containing regularly recurring amide linkages, and to methods of making such polyesters from a new type of monomeric dicarboxylic compound containing amide linkages.

The linear condensation polymers generally fall into two classes, viz. the polyesters and the polyamides. The polyesters are condensation products of one or more glycols with one or more dicarboxylic acids. The polyamides are condensation products of dicarboxylic acids with diamines. Both broad types of condensation polymers in highly polymeric form were shown by Carothers in U. S. 2,071,250. The polyamide polymers are best typified by the nylon-type polymers, for which the advantages and disadvantages are well known. More recently, emphasis has been on development of the polyesters, and among the more widely known polymers of this type are the condensation products of terephthalic acid (usually in ester form) with a polymethylene glycol containing 2–10 methylene groups.

Both the polyesters and the polyamides possess certain advantages and certain disadvantages. The polyesters possess high melting points and exceptional strength characteristics, but the terephthalates are highly insoluble and very difficult to dye. An attempted modification in order to achieve the desirable properties of both the polyesters and the polyamides was disclosed by Carothers and involved coreacting a dicarboxylic acid, a glycol and a diamine to form a "polyester-amide." In such polyester-amides, however, there are the competing reactions of polyester formation and polyamide formation, and the properties of the resulting products were disappointing. An attempt to improve the properties of the polyester-amides was shown by Brubaker et al. U. S. 2,224,037 where an excess of ester was used to try to overcome the tendency for polyamide formation in preference to polyester formation. Even in this case, however, the melting points of the mixed polymers was very low and the polyester-amides known heretofore have not approached the terephthalate polyesters in utility.

In the preparation of condensation polymers, it is desirable to be able to form polymers having a sufficient inherent viscosity to achieve film and fiber-forming products with good physical characteristics. When the fiber-forming stage is reached, the polymers are capable of being oriented by being stretched either longitudinally or laterally or both, and the oriented polymers possess unusual tensile strength, flexibility, elongation and similar physical properties. It has been recognized that the presence of amino groups or amide linkages in condensation polymers should improve solubility, dyeability and the like, but heretofore the other properties such as softening temperature have suffered such a decline that polyester-amides have not achieved widespread commercial acceptance. Furthermore, the presence of amide linkages often results in products with undesirable color. Consequently, it has been desirable to discover some method of forming polymers which retain the desirable properties of polyesters, such as the polyethylene terephthalate esters, but which also include amide linkages effective to improve dyeability, processability, moisture absorption and the like.

It is accordingly an object of this invention to provide new and improved highly polymeric linear polyesters containing amide linkages effective to overcome the disadvantages inherent in prior polyesters without sacrificing the desirable properties characteristic of polyesters, particularly of the terephthalate type.

It is another object of the invention to prepare hitherto unknown homogeneous polyesters possessing regularly recurring polyester-amide structural units but free of the disadvantages usually associated with polyester-amides.

A further object of the invention is to employ new monomeric bifunctional dicarboxylic compounds containing amide linkages equal in number to the ester groups for polyester formation with one or more alkylene glycols, and preferably polymethylene glycols.

Another object of the invention is to provide a new class of highly polymeric linear condensation polymers having physical properties at least as good as any polymers known to the art, and possessing a combination of properties not possible with polymers known heretofore.

Another object of the invention is to provide polymeric materials having unusual utility in the manufacture of shaped articles such as fibers, films, sheeting and the like, and capable of being oriented to give unusual strength, toughness, flexibility, and elasticity combined with improved dyeability, solubility, processability and moisture absorption without objectionable color formation and the sacrifice of softening temperature.

Another object of the invention is to provide polymeric materials possessing unusual utility as film base materials for the manufacture of either black-and-white or color photographic film of exceptional strength, wear resistance and dimensional stability.

Another object of the invention is to provide new polyesters having unusually good quenchability characteristics, and having moisture absorption characteristics making it particularly useful for both fiber and film applications.

Other objects will be apparent from the description and claims which follow. These and other objects are attained by means of this invention wherein highly polymeric linear condensation polymers having a regular structure composed of a succession of recurring structural units of the formula

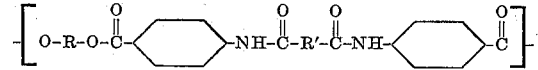

wherein R is an alkylene group containing 2–10 carbon atoms and R' is the same or a different alkylene group containing 4–8 carbon atoms, are prepared by polymerizing a glycol ester of the formula

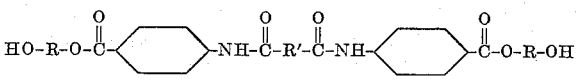

obtained by reacting at least one alkylene glycol of 2–10 carbon atoms, preferably a polymethylene glycol, with at least one ester of a dicarboxylic acid of the formula

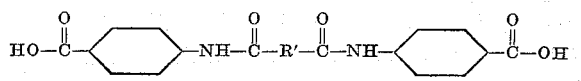

In accordance with the invention, the ester of the dicarboxylic acid of the formula

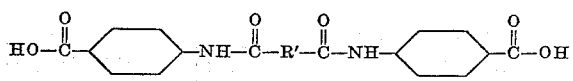

which is reacted with the glycol, is prepared and used in monomeric form, whereby a completely regular structure is obtained since there are no competing polyester and polyamide reactions during the polymerization. Instead, the polymerization reaction is a polyester reaction between the bifunctional dicarboxylic compound and the bifunctional glycol, and the products obtained differ greatly from the mixed polyester-amides of random structure obtained by coreacting a glycol, a dibasic acid and a diamine. Thus, the polymers embodying the invention are readily made in viscosities sufficient for formation of fibers having the improved properties characteristic of oriented polymers, and can be made at viscosities of 0.7–1.2 and preferably about 0.9 with no difficulty. The melting points of the polymers embodying the invention are unexpectedly high, usually being in excess of 200° C. with inherent viscosities of 0.8 or higher, melting points of 230–270° C. commonly being obtained. This melting point range compares closely to that of conventional terephthalate polyesters and is in marked contrast to the melting points of 80–150° C. which are common with previously known polyesteramides prepared by conventional methods. The polymers of the invention also possess great strength, flexibility and wear resistance comparable to the best unmodified polyesters, and in addition contain regularly recurring amide linkages which, without objectionable color formation, are effective to improve dyeability, processability, and moisture absorption. In addition, the polymers of this invention are more readily quenchable than are the terephthalate polyester or the somewhat similar polyester disclosed and claimed in Laakso and Williams, Serial No. 504,107 filed concurrently herewith.

In practicing the invention, the esters of the dicarboxylic acid of the formula

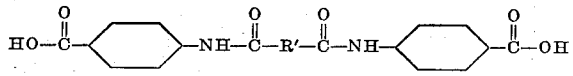

can be prepared in any manner which will give the material in monomeric form. The nature of the ester group is not usually of great significance since it is split off in the initial ester-interchange reaction with the glycol when the glycol ester is formed in the initial stages of the reaction. Thus, for example, the phenyl ester can be used, although the alkyl esters are preferred for convenience in removing the monohydric alcohol liberated in the initial ester-interchange stage of the process. Of the alkyl esters, the lower alkyl esters wherein the alkyl group contains 1–6 carbon atoms are preferred.

The preferred method for making the monomeric esters of bis(N-p-carboxyphenyl)alkylene diamides, and particularly the bis(N-p-carbalkoxyphenyl)polymethylene diamides containing 4–8 methylene groups in the polymethylene unit such as are preferably employed, involves reacting two molar proportions of a p-amino benzoate with one molar proportion of a chloride of an alkylene dibasic acid containing 6–10 carbon atoms whereby the desired monomer is obtained in excellent yield. The p-amino benzoate employed can be any alkyl, aryl or aralkyl ester of p-amino benzoic acid or the free acid itself since the nature of the ester group does not affect either the preparation of the monomer or the subsequent use of the monomer in the condensation polymerization. Usually the ester group is either a phenyl or an alkyl group with the lower alkyl groups being preferred for convenience, economy and ease of removal of the alcohol liberated by splitting off of the ester group during the ester-interchange occurring in the initial stage of the condensation polymerization. Thus, suitable p-aminobenzoates include but are not limited to phenyl p-aminobenzoate, methyl p-aminobenzoate, ethyl p-aminobenzoate, propyl p-aminobenzoate, isopropyl p-aminobenzoate, butyl p-aminobenzoate, isobutyl p-aminobenzoate, and the like.

The p-aminobenzoate can be reacted with any of the chlorides of alkylene dibasic acids of 6–10 carbon atoms, including either straight or branched alkylene groups of 4–8 carbon atoms. The preferred compounds are chlorides of polymethylene dibasic acids as typified by the chlorides of such acids as adipic acid, suberic acid, azelaic acid, pimelic acid, and sebacic acid. The dicarboxylic monomers and their preparation are disclosed and claimed in the copending application of Reynolds and Laakso, Serial No. 504,102 filed concurrently herewith. The preparation of typical dicarboxylate monomers used in practicing the invention is illustrated in the following examples, although it will be understood that other monomers as defined herein can be used in practicing the invention regardless of the method of preparation of such dicarboxylate monomers.

*Example 1*

A solution of 330 g. (2 moles) of ethyl p-aminobenzoate in 4 l. benzene was diluted with 3 l. of water. While the resulting solution was being stirred and cooled with running water, 183 g. (1 mole) of adipyl chloride (150 cc.) and a solution of 85 g. of sodium hydroxide in enough water to make 150 cc. were added alternately in small equal volumes with a ten-minute interval between additions. After all of the ingredients had been added, stirring was continued for 2 hours. The reaction product was filtered off and recrystallized from alcohol using decolorizing carbon to give an 81.5% yield of white bis (N-p-carbethoxyphenyl)adipamide having a melting point of 215–217° C. The analysis was C, 65.5; H, 6.5; and N, 6.5 as compared to a calculated analysis for $$C_{24}H_{28}N_2O_6$$

of C, 65.4; H, 6.3 and N, 6.3.

*Example 2*

Two moles (330 g.) of ethyl p-aminobenzoate were dissolved in 4 l. of benzene and 3 l. of water was added. With good stirring and cooling with running water, 239 g. (1 mole) of sebacoyl chloride (207 cc.) and a solution of 85 g. of sodium hydroxide in enough water to make 207 cc. were added alternately in small equal volumes with a ten-minute interval between additions. After all the ingredients had been added, stirring was continued for 2 hours. The reaction product was filtered off and recrystallized from alcohol using decolorizing carbon to give an 82.8% yield of white bis(N-p-carbethoxyphenyl)sebacamide having a melting point of 181–183° C. The analysis, calculated for $C_{28}H_{36}N_2O_6$ was C, 67.7; H, 7.2 and N, 5.6, as compared to an actual analysis of C, 67.7; H, 7.3 and N, 5.8.

*Example 3*

Ninety-five grams of ethyl p-aminobenzoate was dissolved in 1.5 liters of benzene. Other reactants were 63 g. of suberoyl chloride and 30 g. of sodium hydroxide dissolved in 240 ml. of water. The benzene solution was continuously stirred and one-half of the suberoyl chloride was added whereupon a heavy white precipitate formed. After five minutes had elapsed, one-half of the sodium hydroxide solution was added. After another five minutes, one-half of the remaining suberoyl chloride was added, and this alternate addition was continued until all of the reactants had been added. The reaction mixture was stirred for an additional hour and the reaction product removed by filtration. The bis(N-p-carbethoxyphenyl)suberamide product, after being dried and recrystallized from ethanol, weighed 112 g. and had a melting point of 189–191° C.

*Analysis.*—C, 67.7; H, 6.8; N, 5.8.

Example 4

Bis(N-p-carbethoxyphenyl)azelamide was prepared in similar fashion from 217 g. of ethyl p-aminobenzoate, 148 g. of azeloyl chloride, 60 g. of sodium hydroxide in 440 ml. of water, and 3 liters of benzene. The product obtained weighed 261 g. and had a melting point of 175–176° C.

Similar results are obtained in preparing any of the other monomers embodying the invention. The nature of the ester group on the p-aminobenzoate does not affect the course of the reaction involved in preparing the monomer, or the subsequent condensation polymerization with an alkylene glycol wherein the ester groups are split out in the initial ester-interchange stage of the reaction. Consequently, the nature of the ester group can be varied as desired for convenience and economy.

The dicarboxylic monomers useful in practicing the invention can thus be methyl, ethyl, propyl, isopropyl, butyl, isobutyl or other diesters of such acids as bis(N-p-carboxyphenyl)adipamide, bis(N-p-carboxyphenyl)pimelamide, bis(N-p-carboxyphenyl)suberamide, bis(N-p-carboxyphenyl)azelamide, and bis(N-p-carboxyphenyl)sebacamide; and such monomers can be employed singly or in combinations of two or more of these or similar dicarboxylate monomers as defined herein for condensation with the glycol or glycols.

In practicing the invention, one or more of the dicarboxylate monomers are condensed with one or more alkylene glycols containing 2–10 carbon atoms by heating the reaction mixture in the presence of an ester-interchange catalyst whereby a glycol diester of the dicarboxylic compound is formed in an initial stage, and this glycol ester undergoes condensation polymerization by continued heating under reduced pressure, with evolution of glycol, until the polymer reaches a fiber-forming state. The glycol can be a straight or a branched chain glycol or mixtures of glycols, the polymethylene glycols preferably being employed predominantly.

The glycols which are desirably employed for reaction with the dicarboxylate monomer are the polymethylene glycols such as ethylene glycol, trimethylene glycol, tetramethylene glycol, pentamethylene glycol, hexamethylene glycol, heptamethylene glycol, octamethylene glycol, nonamethylene glycol and decamethylene glycol which can be employed single or in mixtures of two or more, although other alkylene glycols such as 2,2-dimethylpropanediol-1,3 and the like can be used alone or preferably together with a predominant amount of polymethylene glycol. The initial stage of the process embodying the invention can be illustrated graphically as follows:

Under ordinary reaction conditions, there is very little degradation of the dicarboxylate monomer and consequently the polymeric product consists predominantly of regularly recurring structural units of the formula

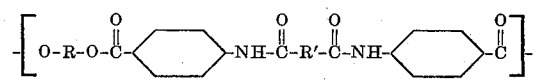

joined directly together in a linear polymer chain. This is in contrast to the random or block structure obtained by concomitant coreaction of a glycol, a dibasic acid and an amino acid where there are competing polyester and polyamide reactions. The polymer obtained has excellent quenchability in addition to excellent strength, flexibility and wear resistance, dye affinity and moisture absorption characteristics. Consequently, it is usually neither necessary nor desirable to add a modifying dibasic acid such as terephthalic acid, isophthalic acid or the like to form a copolyester. Although such other acids, including 4,4'-sulfonyldibenzoic acid, can be used in combination with the glycol and dicarboxylate monomer, the resulting polymers usually have less desirable properties than the unmodified polymers, and such copolyesters are therefore not preferred although the use of modifying diacids is within the scope of the invention.

In carrying out the process embodying the invention, one molar proportion of the dicarboxylate monomer is reacted with at least two molar proportions of glycol. Preferably an excess of glycol is employed. The initial ester-interchange is readily effected by heating the mixture of glycol component and dicarboxylate monomer component in the presence of an ester-interchange catalyst and at a temperature above the melting point of the reactants. The initial stage of the reaction is usually carried out at atmospheric pressure and a temperature of 100°–300° C. and preferably 200°–300° C. for best results, although lower or higher temperatures can be employed in some cases. During the course of the ester-interchange in the initial stage of the process, monohydric alcohol is liberated corresponding to the nature of the ester groups on the dicarboxylate monomer or water when the free dicarboxylic acid is used. For best results, the water or alcohol is removed from the reaction zone as it is liberated in order to shift the reaction equilibrium to optimum formation of the glycol ester of the dicarboxylate monomer. As has been indicated, the dicarboxylate monomer is desirably employed in the form of a lower alkyl diester for ease of removal of the liberated alcohol. If desired, however, higher alkyl or phenyl esters can be used, as well as the free dicarboxylic acid

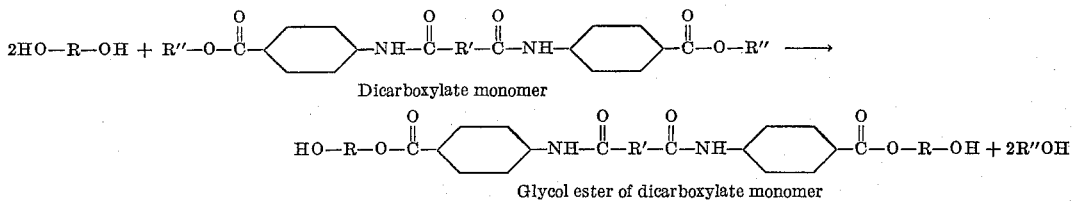

Dicarboxylate monomer

Glycol ester of dicarboxylate monomer

In this initial stage equation, R and R' represent alkylene groups of 2–10 carbon atoms, and R'' is preferably a lower alkyl group but can be hydrogen, a higher alkyl group or a phenyl group as desired.

The second stage of the process embodying the invention can be illustrated graphically as follows:

or an ester-forming derivative thereof such as a salt, halide or amide.

The process is facilitated by use of an ester-interchange catalyst, a large number of such catalysts being known to the art. Typical ester-interchange catalysts which can be employed include the metal hydrides such as cal-

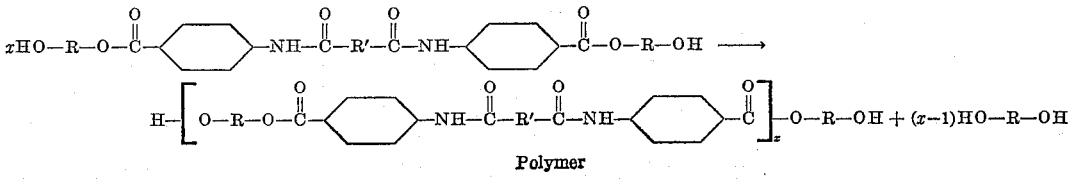

Polymer cium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5-30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can be effected by first obtaining a low viscosity polymer in powder form, and then continuing the polymer build-up in powder form under vacuum, or by continuing the heating after the initial stage under reduced pressure whereby the polymer remains molten until the desired molecular weight and inherent viscosity is achieved.

The polymers embodying the invention are polymerized until a fiber-forming stage is achieved, i. e. until a rod dipped into the melt will pull a filament when drawn from the melt. Usually for optimum results, the polymerization is carried out until an inherent viscosity of at least 0.8 is attained with viscosities of 0.8-1.1 being preferred, although lower or higher viscosities may be desired in certain cases. The polymers of the invention usually have melting points above 200° C. The preferred polymer compositions are those having melting points in the range of about 230°-280° C., since the polymers melting above about 280° C. are difficult to extrude and process in commercial practice.

As has been indicated, any one or more of the alkylene glycols containing 2-10 carbon atoms can be condensed with any one or more of the dicarboxylate monomers as defined herein. The resulting polymers can be used alone or in blends of two or more of such polymers, or blends of such polymers with other polymeric materials such as polyesters, polyamides, copolyesters, polyesteramides and the like. In some cases, it is also desirable to modify the polymers by coreacting another dicarboxylic acid (preferably in ester form) with the glycol and dicarboxylate monomer, such other dicarboxylic acids being typified by aromatic dibasic acids such as terephthalic acid, isophthalic acid, 4,4'-sulfonyldibenzoic acid and the like or aliphatic dibasic acids such as adipic acid, sebacic acid, azelaic acid and the like. The polymers of the invention can be quenched following polymerization by cooling to a temperature below the minimum crystallization temperature, usually below about 80° C. The polymerization proceeds rapidly and ordinarily the fiber-forming stage is reached within 10-30 minutes, although the time necessary for polymerization will vary depending upon the heating temperature, kind and amount of catalyst and similar variable factors. The polymerization is facilitated by removal from the reaction zone of the glycol liberated during the polymerization.

The polymers thereby obtained can be extruded from the melt to form filaments or sheets as desired. The resulting shaped articles are then oriented by being stretched either laterally or longitudinally or both whereby a marked increase in physical properties is obtained. The degree of stretching will vary somewhat depending upon the polymer composition and the properties desired, but sheets, films, fibers, etc. are usually stretched 50-600% of their original extruded dimension for best results. The shaped articles are usually cold-drawn, i. e. drawn at a temperature between the second order transition temperature and the minimum crystallization temperature of the polymer; although, unlike the usual polyesters, the polymers embodying the invention can be oriented by drawing at temperatures of as much as 50° above the minimum crystallization temperature in some cases.

The fibers, films, sheets, etc. which have been drawn are characterized by exceptional physical and mechanical properties, including strength, flexibility, wear resistance and the like, comparable to terephthalate polymers. In addition, the polymers of the invention have unusually high heat distortion temperatures which are often as much as 40° C. above the ordinary heat distortion temperature of terephthalate polyesters which have been oriented but not relaxed. The polymers of the invention thus possess the excellent melting point and physical characteristics of the best polyesters known heretofore but combine this with unusually high heat distortion temperatures, excellent dye affinity, and moisture adsorption higher than that of conventional polyesters. The high heat distortion characteristics are attained by heating the oriented polymer above its minimum crystallization temperature, as for example at 170° C., to cause crystallization but without the necessity of shrinking the stretched polymer as is usually the case.

In fiber applications, filaments having strength of as high as 6-8 grams per denier can be readily obtained, combined with good dyeability and moisture absorption which usually are sacrificed in conventional polyesters. The polymers also possess excellent utility in photographic applications as for example for use as film base for carrying photosensitive silver halide emulsions in black-and-white or color film. The unusually high heat distortion temperature also makes these polymers unique for applications where dimensional stability against thermal distortion is a serious problem.

As has been indicated, any of the polymers consisting essentially of recurring structural units of the formula

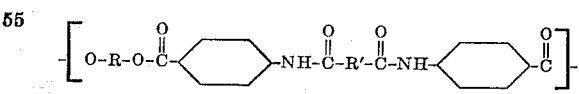

wherein R is an alkylene group of 2-10 carbon atoms and R' is a polymethylene group containing 4-8 methylene radicals, are within the scope of the invention. For manufacture of films and fibers, it is usually desirable to employ a polymer wherein the total number of carbon atoms in R and R' together is at least 10 in at least half of the recurring structural units. For best results and optimum combination of properties, the combined number of carbon atoms in R and R' is desirably at least 12 in at least one-quarter of the recurring structural units. The polymers which have shown particular utility are those wherein a substantial amount of the polymer consists of structural units wherein R' is either hexamethylene, heptamethylene or octamethylene and R is either tetramethylene, pentamethylene or hexamethylene. Thus, for example, the polymers which consist essentially of a succession of one or more of the groups

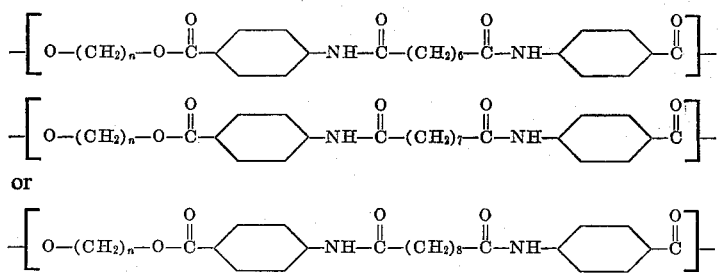

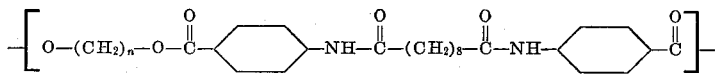

wherein $n=4$, 5 or 6, joined together in linear configuration have melting points in the range of 235–265° C. and can be readily extruded from the melt into films, sheets or fibers which, after drawing and heat setting, possess excellent mechanical and physical properties combined with good dye affinity and moisture absorption characteristics. The polymers of the invention are of particular utility for manufacture of fibers or film support but can be used for a variety of shaped articles such as tubing, as well as sheeting for packaging, and the like.

In the manufacture of film or sheeting, the polymer is desirably extruded from the melt either onto a casting roll or between paired rolls and then drawn both longitudinally and laterally, either concomitantly or successively, to from 100–600% of its original dimensions in order to orient the molecules. Thereafter, the oriented film or sheet is desirably heated at a temperature above the minimum crystallization temperature until the desired degree of crystallization results. In the case of film to be used for photographic applications where it is desirable to coat the film with photosensitive silver halide emulsions or other coating layers, the film can be coated with a subbing material, such as a resin or copolymer sub before the orientation or between the drafting steps or before the heat treatment following orientation. In some cases, particularly with modified polyester subs of good solubility, it is more convenient to sub the oriented and crystallized film after the film processing has been completed. The subbed film can then be supplied with the usual photosensitive emulsion layers, anti-halation backing, etc. in accordance with well known photographic practice.

In the manufacture of fibers, the molten polymer is extruded through a spinneret and quenched. The resulting fiber is then drafted 50–600% and heat treated for crystallization. The resulting fibers have hot bar sticking temperatures above 200° C. in most cases, combined with strength of the order of 6–8 grams per denier, excellent dye affinity for most textile dyes and moisture absorption characteristics which make the fibers resemble natural fibers more than is generally the case with synthetic polyester fibers. In contrast to the usual polyesters containing amino groups, very little color formation is observed and textiles prepared from fibers embodying the invention can be dyed to deep shades or with pastel dyes of fleeting tints as desired. Consequently, the polymers of the invention show unique versatility among the synthetic condensation polymers since they combine the desirable characteristics of both the polyesters and the polyamides without the disadvantages of either type.

The improved results obtained in accordance with the invention appear to result from the use of the particular dicarboxylate monomer and the unusually regular structure which is obtained by condensing the glycol with the dicarboxylate monomer consisting functionally of N,N'-bis(p-carboxyphenyl)alkylene diamide. In the process of the present invention, polyester formation is involved since the amide groups are not functional in the condensation. Thus, the results obtained are in marked contrast to processes where there are competing polyester and polyamide reactions which lead to a random or block structure. Such processes giving random or block structures are designated as heterogeneous polyester-amide processes, and the products obtained therefrom are usually of greatly inferior properties particularly as regards melting point, and physical and mechanical properties. In fact, the usual polyesteramides are of such a low degree of utility for fiber and film formation that attempts have been made to modify polyesters, such as terephthalate polyesters, by reacting the already formed polymer with amines to introduce active sites for enhancing dyeability.

The improved results obtained in accordance with this invention are illustrated by the following examples of certain preferred embodiments thereof, it being understood that the examples are illustrative only and not intended to limit the scope of the invention unless otherwise specifically indicated. Similar results are obtained with the other polymers embodying the invention as described herein.

*Example 5*

A mixture of 50 g. of bis(N-p-carbethoxyphenyl)azelamide, 50 g. of 1,4-butanediol and 1 ml. of catalyst solution prepared by dissolving 3 ml. of titanium butoxide in a solution of 0.2 g. of sodium in 100 ml. of absolute ethanol was heated under nitrogen for 15 minutes at a temperature of 260–270° C. The reaction mixture was then stirred for 25 minutes at 270° C. and about 1 mm. pressure. A very viscous polymer having an inherent viscosity of 0.63 (in 60:40 phenol:tetrachloroethane) and a melting point of 240° C. was obtained. Upon cooling under nitrogen, the polymer crystallized to a white porcelain-like mass. Fibers and films extruded from the melt quenched very readily and were oriented by drafting about 200% and then heat set. The resulting oriented and crystallized polymer had a Young's modulus of $5.8 \times 10^4$, a yield strength of 2000 kg./cm.$^2$, a break strength of 2700 kg./cm.$^2$ and elongation at break of 43%. The oriented and crystallized fibers and films had excellent flexibility and wear resistance in addition to their high strength characteristics. Fibers of this and other polymers embodying the invention have strengths of the order of 6–8 g. per denier and have much better dye affinity than do terephthalate polyesters. Films of this and similar polymers embodying the invention can be subbed with resin subs and used as support for silver halide emulsions in both black-and-white and color photographic film with excellent results. Generally speaking, the polymers of this invention have somewhat lower melting points than the corresponding polymers of N,N'-bis(p-carboxybenzoyl)alkylene diamines which compensates for a higher melt viscosity. The melting points are usually in excess of 200° C., however, which is sufficiently high for both fiber and film applications. The quenchability of these polymers is better than that of either the terephthalate polyesters or the polymers of N,N'-bis(p-carboxybenzoyl)alkylene diamines, which facilitates their use in commercial processes.

*Example 6*

In preparing the polymers of the invention, the chain length of the glycol or the chain length of the group between the amide groups of the dicarboxylate monomer, or both, can be varied to give the desired physical characteristics. Thus, a mixture of 50 g. of bis(N-p-carbethoxyphenyl)azelamide and 25 g. of 1,6-hexanediol was condensed according to the process of the preceding example. The first or ester-interchange stage was carried out by heating for 20 minutes at 260° C., and the polymerization was effected in 20 minutes at 270° C. and 1 mm. pressure. The resulting polymer had an inherent viscosity of 0.72 and a melting point of 240° C. The polymer after extrusion, orientation and heat setting had a Young's modulus of $5.8 \times 10^4$, a yield strength of 2500 kg./cm.$^2$, a break strength of 3400 kg./cm.$^2$, and an elongation of 47%. As with the other polymers of the invention, this material finds unusual utility in the manufacture of fibers and films of exceptional quality.

*Example 7*

Fifteen grams of bis(N-p-carbethoxyphenyl)suberamide was condensed with 15 g. of 1,4-butanediol in the presence of 0.3 ml. of catalyst solution as described herein by heating for 20 minutes at 260° C. followed by 25 minutes at 270° C. and 1 mm. pressure. The resulting white crystalline polymer had an inherent viscosity of 0.63 and a melting point of 265° C. After orientation and crystallization, the polymer had a Young's modulus of $8.2 \times 10^4$, a yield strength of 2900 kg./cm.$^2$, a break strength of 3500 kg./cm.$^2$ and an elongation of 11% at break.

*Example 8*

In accordance with the described process, 15 g. of bis(N-p-carbethoxyphenyl)suberamide and 15 g. of 1,6-hexanediol were condensed by heating at 260° C. for 15 minutes and at 270° C. and 1 mm. pressure for 25 minutes. The resulting white crystalline polymer had an inherent viscosity of 0.73 and a melting point of 250° C. After orientation and crystallization, the polymer had a Young's modulus of $8.1 \times 10^4$, a yield strength of 2500 kg./cm.$^2$, a break strength of 3400 kg./cm.$^2$ and an elongation of 27%.

*Example 9*

The preferred polymers for film base use are those prepared from bis(N-p-carboxyphenyl)suberamide and those prepared from bis(N-p-carboxyphenyl)sebacamide, particularly with 1,4-butanediol or 1,6-hexanediol. A mixture of 50 g. of bis(N-p-carbethoxyphenyl)sebacamide, 50 g. of 1,4-butanediol and 1 ml. of the catalyst solution described in Example 5 was heated for 15 minutes at 260° C. under nitrogen. Thereafter, the reaction mixture was stirred and heated at 270° C. and 1 mm. pressure for 25 minutes. The resulting white crystalline polymer melted at 240° C. and had an inherent viscosity of 0.69. The polymer melt extruded readily to form films and fibers which quenched easily with no tendency to crystallize. After orientation by stretching about 200% below the crystalline temperature followed by heat setting at about 170° C., the polymer had a Young's modulus of $5.9 \times 10^4$, a yield strength of 2200 kg./cm.$^2$, a break strength of 3100 kg./cm.$^2$ and an elongation of 19%. If desired, the inherent viscosity of the polymer can be increased by continuing the heating. Thus, when the polymer of bis(N-p-carboxyphenyl)sebacamide and 1,4-butanediol was carried to an inherent viscosity of 0.83, the melting point was 257° C., and after orientation and crystallization, the polymer had a Young's modulus of $4.4 \times 10^4$, a yield strength of 1900 kg./cm.$^2$, a break strength of 2500 kg./cm.$^2$ and an elongation of 24%. Although this polymer could be spun into fibers of excellent mechanical and physical properties, it was of particular utility for film base in photographic applications. In black-and-white or color photographic film, the oriented polymer shows excellent wear resistance, strength, and resistance to flex cracking. This and similar polymers exhibit unusually high heat distortion temperatures which is highly desirable for thermal dimensional stability. Once oriented, it does not readily lose its orientation. Its melting point makes melt extrusion practical on a commercial scale, without having an objectionably low softening temperature.

The amide linkages in this monomer, as well as in the other monomers suitable for use in accordance with the invention, are very stable under the polymerization conditions so that the content of free amine is very low in the polymers. Consequently, the problem of objectionable color formation common to polyesteramide processes known heretofore is largely obviated in the process of this invention. As can be seen from the examples, the polymerization in accordance with this invention proceeds rapidly to the fiber-forming stage which is a definite advantage from the standpoint of commercial practice. The ease of ester-interchange and condensation employing the dicarboxylate monomers herein described makes the manufacture of polymer possible by continuous as well as batch processes. Furthermore, the polymerization can be carried to any desired molecular weight and inherent viscosity with ease.

If desired, mixtures of the dicarboxylate monomers and/or the glycols can be used in practicing the invention. The use of mixtures is particularly desirable when a short chain glycol is used or a dicarboxylate monomer containing a relatively short carbon chain between the nitrogen atoms, since the short chain compounds tend to give higher melting polymers than may be desired for ease of melt extrusion in commercial practice. Thus, it is usually desirable to employ a substantial amount of glycol and dicarboxylate monomer wherein the number of carbon atoms in the polymethylene portions of these two materials totals at least 10 and more preferably at least 12. Since the long chain glycols, such as 1,10-decanediol, are relatively scarce and expensive, however, it is usually desirable to use a diamide monomer of an acid such as suberic, azelaic or sebacic acid.

*Example 10*

A mixture of 50 g. of bis(N-p-carbethoxyphenyl)sebacamide, 25 g. of 1,6-hexanediol and 1 ml. of sodium titanium ethoxide butoxide catalyst solution was heated at 260° C. for 20 minutes under nitrogen. Thereafter the reaction mixture was heated at 270° C. and 1 mm. pressure for 20 minutes with removal of glycol as formed. The white crystalline polymer obtained melted at 236° C. and had an inherent viscosity of 0.72. After orientation and crystallization, the polymer had a Young's modulus of $5.8 \times 10^4$, a yield strength of 2500 kg./cm.$^2$, a break strength of 3300 kg./cm.$^2$ and an elongation at break of 34%. Similar polymers were prepared by condensing bis-(N-p-carbethoxyphenyl)adipamide variously with ethylene glycol, 1,5-pentanediol, 1,4-butanediol and 1,6-hexanediol. The stability of these polymers was evidenced by the fact that only a slight color developed when the condensation polymer of ethylene glycol and bis(N-p-carbethoxyphenyl)adipamide, normally a white crystalline solid, was heated at 300° C. The course of the reaction is not significantly altered by using varying concentrations of any of the well known ester-interchange catalysts, or by using any of the esters of the dicarboxylate monomers as described herein.

Thus, by means of this invention, a new class of highly useful polymers are provided which are of particular utility in the manufacture of fibers, films and sheeting. The examples illustrate the unique combination of properties possessed by the polymers of the invention, and similar results are obtained with the other polymers within the scope of the invention as described herein. By means of this invention, it is possible to obtain in a single polymer the advantageous characteristics of both the polyesters and the polyamides.

In effecting the condensation reaction, the ester-interchange stage of the process is usually carried out at a temperature above 200° C. or above the melting point of the reactants. The second or polymerization stage is also usually carried out above 200° C. and can be effected above the melting point of the glycol ester (and the polymer being formed) in the melt process or at a temperature not more than 20° C. below the melting point of the glycol ester in the powder polymerization process. In the case of the polymers prepared from such glycols as tetramethylene, pentamethylene or hexamethylene glycol, the temperature in the polymerization stage is preferably at least 240° C. The temperature employed can be varied, of course, depending upon the polymerization time desired, the degree of vacuum employed, the melting point of the reactants and products and similar variable factors. The temperature employed should be at least as high as the boiling point of the glycol liberated at the pressure employed and can therefore be at or about the boiling temperature of the glycol if atmospheric pressure is employed or if a lower pressure is employed during the polymerization stage. The polymerization stage is desirably carried out at pressures below about 1 mm. Hg for optimum results with pressures of 0.1–0.5 mm. or lower being particularly suitable. The polymerization stage is continued until the polymer obtained is capable of forming fibers and films (including sheets) which can be oriented to give the highly flexible and strong shaped articles for which these polymers are particularly adapted.

Although the invention has been described in detail with particular reference to certain preferred embodiments thereof, it will be understood that variations and modifications can be effected within the spirit and scope of the invention as described hereinabove and as defined in the appended claims.

We claim:

1. A highly polymeric material capable of forming orientable fibers and films, said material having an inherent viscosity of at least 0.7 having a melting point of at least 200° C. and consisting essentially of a succession of recurring structural units of the formula

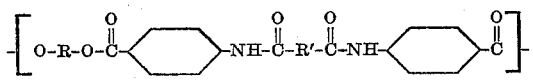

wherein R is an alkylene group of 2–10 carbon atoms and R' is an alkylene group of 4–8 carbons atoms, the combined number of carbon atoms in R and R' being at least 10 in at least half of said recurring structural units, the group

being a phenylene group.

2. A highly polymeric material capable of forming orientable fibers and films, said material having an inherent viscosity of at least 0.7 having a melting point of at least 200° C. and consisting essentially of a succession of recurring structural units of the formula

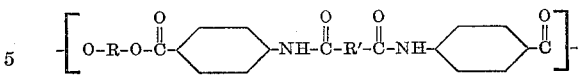

wherein R is an alkylene group of 2–10 carbon atoms and R' is an alkylene group of 4–8 carbon atoms, the combined number of carbon atoms in R and R' being at least 12 in at least one quarter of said recurring structural units, the group

being a phenylene group.

3. A highly polymeric material in accordance with claim 1 wherein R is a polymethylene group of 2–10 carbon atoms and R' is an alkylene group of 4 carbon atoms.

4. A highly polymeric material in accordance with claim 1 wherein R is a polymethylene group of 2–10 carbon atoms and R' is an alkylene group of 7 carbon atoms.

5. A highly polymeric material in accordance with claim 1 wherein R is a polymethylene group of 2–10 carbon atoms and R' is an alkylene group of 6 carbon atoms.

6. A highly polymeric material in accordance with claim 1 wherein R is a polymethylene group of 2–10 carbon atoms and R' is an alkylene group of 8 carbon atoms.

7. A highly polymeric material in accordance with claim 1 wherein R is a polymethylene group of 4 carbon atoms and R' is an alkylene group of 8 carbon atoms.

8. A highly polymeric material in accordance with claim 1 wherein R is a polymethylene group of 6 carbon atoms and R' is an alkylene group of 8 carbon atoms.

9. A highly polymeric material in accordance with claim 1 wherein R is a polymethylene group of 4 carbon atoms and R' is an alkylene group of 6 carbon atoms.

10. A highly polymeric material in accordance with claim 1 wherein R is a polymethylene group of 6 carbon atoms and R' is an alkylene group of 6 carbon atoms.

11. Synthetic fiber of the polymeric material of claim 1.

12. Oriented sheeting of the polymeric material of claim 1.

References Cited in the file of this patent

FOREIGN PATENTS 889,344   France _____ Jan. 6, 1944